United States Patent [19]

Steinkotter

[11] Patent Number: 5,080,221
[45] Date of Patent: Jan. 14, 1992

[54] ROLLER BELT

[75] Inventor: Franz-Albert Steinkotter, Walberberg, Fed. Rep. of Germany

[73] Assignee: O & K Orenstein & Koppel Aktiengesellschaft, Berlin, Fed. Rep. of Germany

[21] Appl. No.: 445,718

[22] PCT Filed: Jun. 9, 1988

[86] PCT No.: PCT/EP88/00510
§ 371 Date: Dec. 11, 1989
§ 102(e) Date: Dec. 11, 1989

[87] PCT Pub. No.: WO88/09759
PCT Pub. Date: Dec. 15, 1988

[30] Foreign Application Priority Data

Jun. 12, 1987 [DE] Fed. Rep. of Germany ....... 3719608
Jul. 23, 1987 [DE] Fed. Rep. of Germany ....... 3724376

[51] Int. Cl.$^5$ .............................................. B65G 15/08
[52] U.S. Cl. ...................................... 198/819; 198/842
[58] Field of Search ................... 198/819, 842

[56] References Cited

U.S. PATENT DOCUMENTS 4,723,653 2/1988 Engst .................................. 198/819

FOREIGN PATENT DOCUMENTS

| 0050962 | 5/1982 | European Pat. Off. |
| 0194509 | 9/1986 | European Pat. Off. |
| 0253148 | 1/1988 | European Pat. Off. |
| 3145899 | 10/1982 | Fed. Rep. of Germany |
| 3620906 | 1/1987 | Fed. Rep. of Germany |
| 0104808 | 6/1983 | Japan ................................... 198/819 |
| 0244705 | 12/1985 | Japan ................................... 198/819 |
| 0007127 | 1/1986 | Japan ................................... 198/819 |
| 2094741 | 9/1982 | United Kingdom ................. 198/819 |
| 2177994 | 2/1987 | United Kingdom ................. 198/819 |

Primary Examiner—D. Glenn Dayoan
Attorney, Agent, or Firm—Spencer & Frank

[57] ABSTRACT

A conveyor having a roller belt closed in the circumferential direction having overlapping belt edges and an outer circumference and a plurality of belt support rollers guiding the roller belt along a conveying path, each support roller having a running face in contact with the outer circumference of the belt, each support roller defining an overlap with the next following support roller in the circumferential direction so that an imaginary axial extension of its running face intersects the running face of the next following support roller. Each overlap being oriented in the same direction so that in the event the belt rotates in the direction of the circumference, the outer edge of the belt in the overlap region contacts the running face instead of touching the edge of the following support roller.

8 Claims, 2 Drawing Sheets

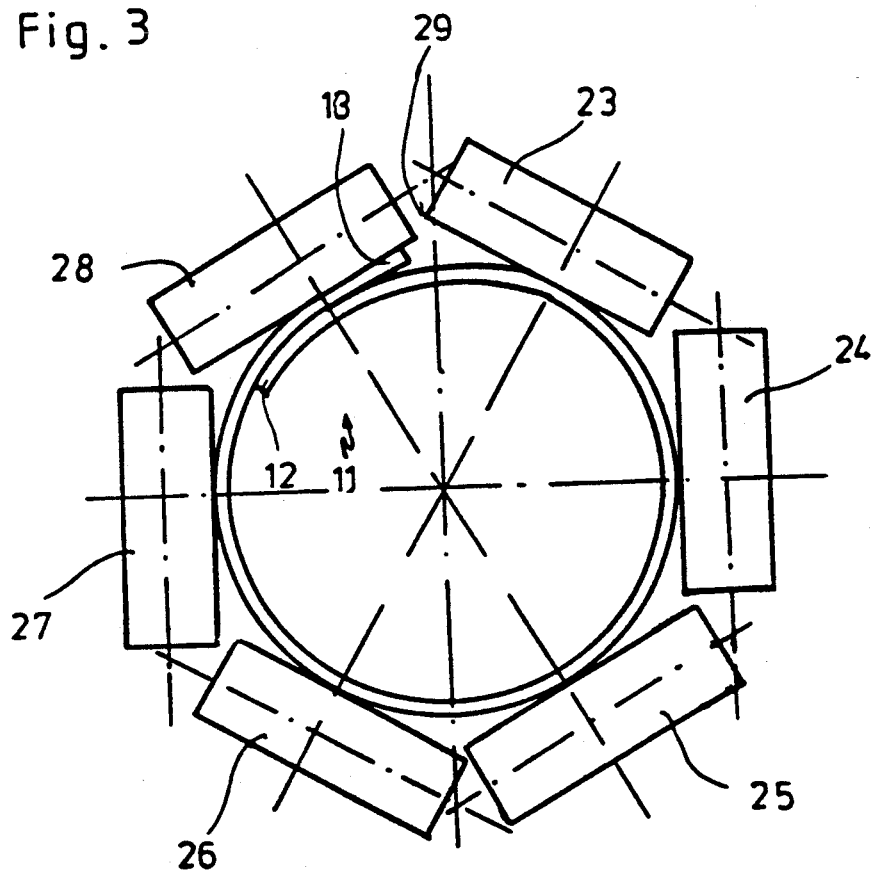

bandand# ROLLER BELT

BACKGROUND OF THE INVENTION

The invention relates to a roller belt which is closed in the circumferential direction and has overlapping belt edges. Along a conveying path, the belt is brought through several support roller stations, with the respective support roller stations being provided with several belt support rollers which lie against the outer circumference of the roller belt.

German Offenlegungsschrift (printed, unexamined application) DE 36 20 906 discloses a roller belt which has the features of being closed in the circumferential direction, having overlapping belt edges, and being guided along a conveying path through a plurality of support roller stations which have respective belt support rollers in contact with the outer circumference of the roller belt. Additionally, only one common belt support roller is provided between the transporting and the return feed. It is known that roller belt conveyors do not always maintain their desired geometry which is necessary for optimum arrangement of the belt support rollers. In all prior art arrangements, the respective belt edge of the outwardly overlapping side runs onto the edge of a belt support roller, thus always causing considerable damage to the belt and reducing its service life. If tension cables are additionally worked into the outer belt zones, i.e. its edge region, these tension cables are also affected and finally wear through.

The most varied aids are employed to improve roller belt guidance in order to prevent or impede travelling of the belt. For example, guide and control rollers are employed or belt support rollers are placed at a camber (see, e.g. German Offenlegungsschrift 31 45 899).

However, all of these devices have the drawback that they require additional expenditures and that the resulting additional friction causes premature wear with increased driving power.

SUMMARY OF THE INVENTION

It is thus the object of the invention to improve a roller belt as described above regarding DE 36 20 906 so that it is able to freely move on its path in the circumferential direction within the belt support rollers without running on any edges of the belt support rollers. In dependence on its load and on extraneous influences, such as sun, rain or the like, the belt will then always be able to take on its optimum position and opening along the way is to be avoided.

This is accomplished according to the invention in that the belt support rollers are arranged along the circumference of the roller belt in such a manner that, without contacting one another, they are superposed on one another. This measure makes it possible for the mutually overlapping edges, i.e. the respectively radially outward edges of the roller belt, during rotation in the circumferential direction, to no longer run onto the edges of the next following belt support rollers. Damage to the belt edges is thus avoided, and the service life of the belt is extended. If the belt is twisted, the respective outer edge always moves directly onto the running surface of the next following belt support roller (wedge effect).

Appropriate modifications of the invention are defined in the dependent claims.

The subject matter of the invention can be employed with fixed belt support rollers as well as with support roller garlands even if they are based on a different number of belt support rollers; namely, an odd number (five, seven, nine) for fixed belt support rollers and an even number (preferably six) for support roller garlands.

The belt support rollers are arranged in such a way that each belt support roller is overlapped at one end by the next following belt support roller, with all belt support rollers being arranged, for example, in the clockwise direction or all in the opposite direction, depending on how the overlap of the belt edges is selected. In any case, the overlaps of belt support rollers and belt must be in the same direction. The oblique position of each following belt support roller causes the roller belt to continue to travel in the circumferential direction without giving any resistance to the respective belt edge. Twisting the belt roller in the opposite direction is also without problems since there will be no contact with the overlapping belt edge.

The configuration and arrangement of the belt support rollers according to the invention thus makes it possible for the belt roller to freely move in the circumferential direction without the use of constraining forces. Depending on conditions, the belt is able to select its optimum position by itself without encountering the danger that it will inadvertently open along the conveying path or that the belt edges place themselves against an outer edge of a belt roller with the resulting destructive consequences. The invention is illustrated in the drawing and will now be described in detail. It is shown in:

BRIEF DESCRIPTION OF THE DRAWINGS

FIGS. 1 to 3 are schematic views of the roller belt according to the invention in various embodiments.

DESCRIPTION OF THE PREFERRED EMBODIMENTS

Figure 1:
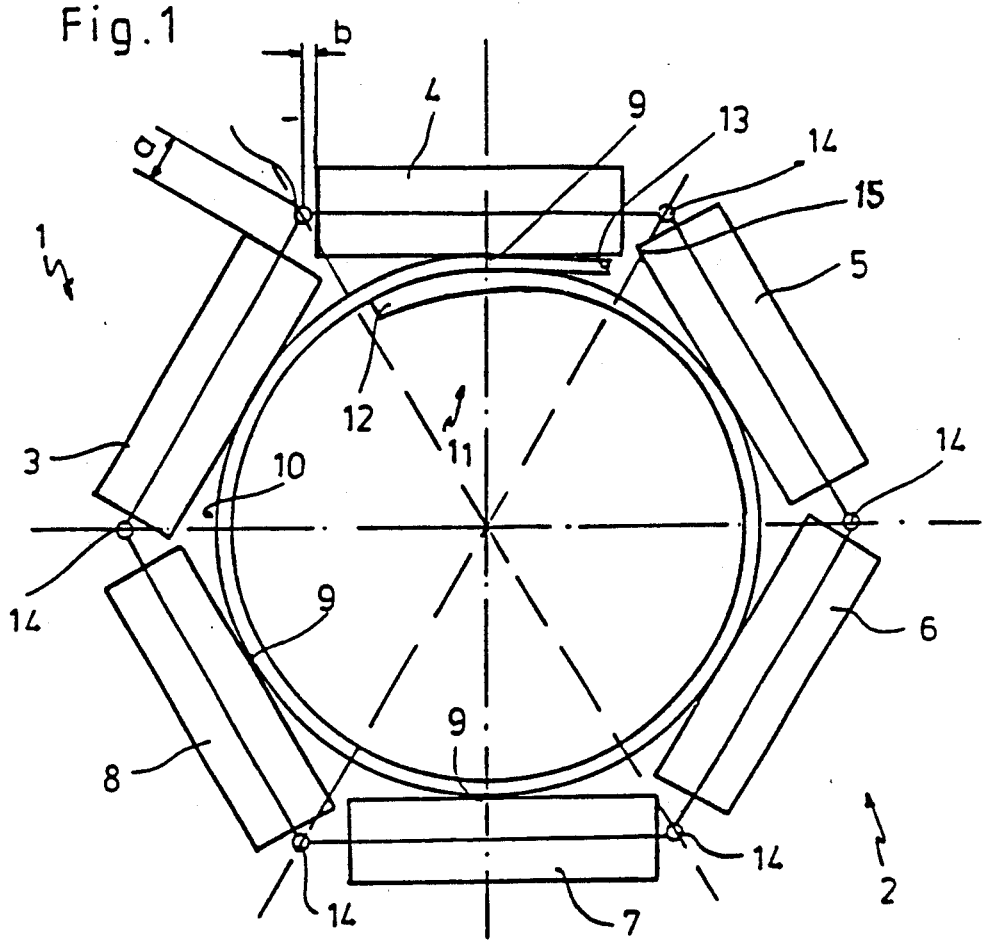

FIG. 1 shows a roller belt conveyor which is held by means of upper and lower support roller garlands 1 and 2 in a support roller station not shown in detail. Each support roller garland 1, 2 is composed of three belt support rollers 3, 4, 5 and 6, 7, 8, whose running faces 9 lie against the outer circumference 10 of the roller belt. In the region of belt support roller 4, which is arranged essentially horizontally, there is disposed the overlap region 11 where belt edges 12 and 13 lie on top of one another.

Belt support rollers 3 to 8 are each connected with one another by way of a single hinge point 14 which is arranged in such a way that belt support rollers 3 to 8 overlap one another. This overlap is produced by different distances a and b and prevents the belt edge 13 from running, for example, onto the edge 15 of the next following belt support roller 5. An imaginary axial extension of each running face 9 intersects the running face 9 of the next following support roller. In the illustrated embodiment, belt support rollers 3 to 8 are provided in an even number.

Figure 2:
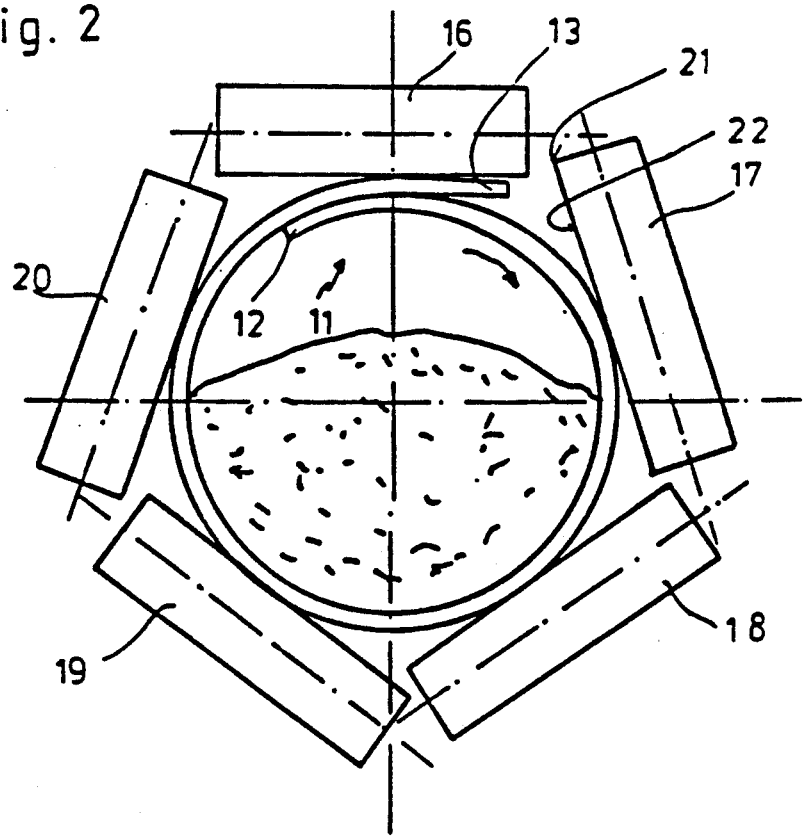

FIG. 2 shows a roller belt conveyor of the same structure as shown in FIG. 1 with overlapping belt edges 12, 13. Here, however, only five fixed belt support rollers 16, 17, 18, 19, 20 are provided, with the overlap region 11 here again being provided in the region of an approximately horizontally extending belt support roller 16. By superposition of belt support rollers 16 to 20 it is again prevented that belt edge 13 comes in contact with the edge 21 of the next following belt support roller 17. If the roller belt is rotated clockwise, belt edge 13 runs directly onto the running face 22 of belt support roller 17 and is thus protected against damage.

FIG. 3 shows a roller belt equipped with six belt support rollers 23 to 28 which are arranged in such a manner that an approximately V-shaped support is formed int he upper and lower region of the roller belt while the lateral belt support rollers 24 and 27 are arranged essentially vertically. Here again, belt support rollers 23 to 28 overlap one another so that the belt edge 13 is unable to abut at the edge 29 of the next following belt support roller 23. The overlap region 11 in this example is provided with an offset of about 30° relative to the vertical and lies against belt support roller 28.

I claim:

1. A conveyor comprising:
   a roller belt closed in the circumferential direction having overlapping belt edges and an outer circumference; and
   a plurality of belt support rollers guiding said roller belt along a conveying path, each one of said plurality of belt support rollers having a running face in contact with said outer circumference of the roller belt, each said belt support roller defining an overlap with the next following belt support roller in the circumferential direction so that an imaginary axial extension of its running face intersects the running face of the next following belt support roller, and each said overlap being oriented in the same direction.

2. A conveyor as defined in claim 1, wherein the direction of overlap of the belt support rollers is adjustable.

3. A conveyor as defined in claim 1, wherein the belt support rollers are arranged in such a manner that the roller belt rests on two V-shaped belt support rollers in the transporting portion of the belt.

4. A conveyor as defined in claim 1, wherein the belt support rollers are fixedly attachable to support roller stations so that an uppermost belt support roller extends essentially horizontally.

5. A conveyor as defined in claim 1, wherein said plurality of belt support rollers comprises an odd number, one of said belt support rollers is horizontally arranged, and the belt support rollers provided circumferentially next to the horizontally arranged belt support roller lie against the outer circumference of the roller belt in a plane that is inclined relative to the vertical.

6. A conveyor as defined in claim 1, wherein on a reverse feed one of said plurality of belt support rollers is disposed essentially horizontal and lies at the bottom.

7. A conveyor as defined in claim 1, wherein a single hinge point is disposed between circumferentially adjacent belt support rollers, and said plurality of belt support rollers is attached together via each said single hinge point as support roller garlands.

8. A conveyor as defined in claim 1, wherein a hinge point is disposed between circumferentially adjacent belt support rollers, and said plurality of belt support rollers is attached together via the hinge points as support roller garlands having a superposition at the ends of circumferentially adjacent belt support rollers.

* * * * *